US 6,504,679 B1
Jan. 7, 2003

(12) United States Patent
Ohta

(54) ERASURE PREVENTION IN DISC CARTRIDGE

(75) Inventor: Kenji Ohta, Kyoto (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/674,070

(22) PCT Filed: Mar. 3, 2000

(86) PCT No.: PCT/JP00/01262
§ 371 (c)(1),
(2), (4) Date: Oct. 26, 2000

(87) PCT Pub. No.: WO00/54275
PCT Pub. Date: Sep. 14, 2000

(30) Foreign Application Priority Data

Mar. 5, 1999 (JP) .......................... 11-058471
Jun. 8, 1999 (JP) .......................... 11-161623
Feb. 14, 2000 (JP) ........................ 2000-035513

(51) Int. Cl.$^7$ .................... G11B 23/03; G11B 23/28
(52) U.S. Cl. ........................... 360/133; 369/291
(58) Field of Search ....................... 360/133; 369/291

(56) References Cited

U.S. PATENT DOCUMENTS

| 4,740,948 A | * | 4/1988 | Nakamori et al. | 360/133 |
| 4,908,817 A | * | 3/1990 | Sandell et al. | 360/133 |
| RE33,961 E | * | 6/1992 | Swinburne et al. | 360/133 |
| 5,272,693 A | * | 12/1993 | Fujisawa | 360/133 |
| 5,748,609 A | * | 5/1998 | Tanaka | 360/133 |
| 5,805,566 A | * | 9/1998 | Kobayashi | 360/133 |
| 5,917,803 A | * | 6/1999 | Goto et al. | 369/291 |
| 5,970,045 A | * | 10/1999 | Aoki et al. | 369/291 |
| 5,995,344 A | * | 11/1999 | Fukuda et al. | 360/133 |
| 6,370,108 B1 | * | 4/2002 | Ikebe et al. | 360/133 |

FOREIGN PATENT DOCUMENTS

| DE | 13344209 | 6/1984 |
| EP | 2201885 | 11/1986 |
| EP | 2206897 | 12/1986 |
| EP | 1794532 | 9/1997 |
| EP | 2797195 | 9/1997 |
| GB | 2102188 | 1/1983 |

OTHER PUBLICATIONS

IBM Technical Disclosure Bulletin, vol. 28, No. 9, (1986).

* cited by examiner

Primary Examiner—Brian E. Miller
(74) Attorney, Agent, or Firm—Birch, Stewart, Kolasch & Birch, LLP

(57) ABSTRACT

A disc cartridge includes a disc casing having a disc chamber defined therein for rotatably accommodating the recording medium. The disc casing has a sensor hole and a slot defined in first and second wall portions of the casing that are opposed to each other. A safety device is disposed within the disc casing for preventing information recorded on the erasable recording medium from being erased inadvertently. The safety device includes a bearing bushing integral with the first wall portion, and a switching element connected at one end rotatably with the bearing bushing for angular movement between first and second operative positions. The sensor hole is adapted to be closed by the switching element when the latter is angularly moved to the first operative position.

12 Claims, 5 Drawing Sheets

ERASURE PREVENTION IN DISC CARTRIDGE

This application is the national phase under 35 U.S.C. §371 of PCT International Application No. PCT/JP00/01262 which has an International filing date of Mar. 3, 2000, which designated the United States of America.

TECHNICAL FIELD

The present invention generally relates to a compact optical disc cartridge of a type accommodating therein a rewritable optical disc such as, for example, an erasable optical disc, a magnetooptical disc or a phase-changeable optical disc. More particularly, the present invention relates to a safety device in the optical disc cartridge for preventing information, recorded or otherwise stored on the rewritable disc, from being erased inadvertently.

BACKGROUND ART

Optical disc cartridges are available in a variety of types. Of those optical disc cartridges, the optical disc cartridges utilizing a rewritable optical disc such as, for example, an erasable optical disc, a magnetooptical disc or a phase-changeable optical disc require a safety device installed therein for preventing information recorded or stored on the rewritable optical disc from being erased inadvertently. The safety device generally comprises a movable element that moves selectively between enabled and protected positions. While information can be recorded or overwritten on the optical disc when the movable element is moved to the enabled position, the information recorded, or otherwise stored on the optical disc can be neither recorded nor overwritten in any way whatsoever when the movable element is held at the protected position. To move the movable element in this way, the movable element has a safety lug accessible to the user.

By way of example, the rewritable optical disc cartridges generally comprises a generally square flat casing including top and bottom panels and four side walls. all assembled together to define a disc chamber therein. An optical disc is rotatably housed within the disc chamber. The safety device is operatively accommodated within one of four, generally triangular corner spaces each defined inside and at a corner region of the disc casing. One of the four side walls of the optical disc cartridge that is adjacent the triangular corner space where the safety device is housed has an opening defined therein with the safety lug held in position accessible from outside of the optical disc cartridge so that the user can manipulate the safety lug.

Other than the safety device, the optical disc cartridge has two or more positioning and identifier holes defined in the bottom panel and positioned adjacent two or more corner regions of the disc casing. The positioning holes are cooperable with corresponding positioning pins installed in an optical disc player and are utilized to set the optical disc cartridge in position ready to establish an interactive relation between the optical disc and an optical read/write head once the optical disc cartridge is loaded in the optical disc player. On the other hand, the identifier hole or holes are utilized to allow the optical disc player to recognize the specification of the optical disc cartridge loaded therein. The specification of an optical disc cartridge includes the recording capacity of the optical disc and/or the optical characteristic (e.g., erasable or non-erasable) of the optical disc. It is pointed out that where the optical disc housed in the cartridge is a non-erasable type, the optical disc cartridge may not be provided with the safety device.

The optical disc cartridge also has a sensor hole defined at a location aligned with the movable element of the safety device, which hole is selectively opened or closed by the movable element. By way of example, the sensor hole may left open when the movable element is in the protected position, but be closed when the movable element is in the enabled position. The movable element employed in the prior art safety device is generally in the form of an elongated slide piece linearly slidable along the side wall of the disc casing between the enabled and protected positions.

Considering that the optical disc cartridge is getting. compact and compact and a currently commercially available MD (Mini-Disc) cartridge has a size of about 7.2×6.8 cm with the erasable optical disc being about 6.4 cm, the corner spaces available in the optical disc cartridge are correspondingly getting smaller. The smaller the corner spaces, the smaller the safety device and, thus, the smaller the stroke of movement of the slide piece. If the slide piece is reduced in size, the safety lug must also be reduced in size in order to secure a required stroke of movement for the slide piece. The smaller the safety lug, the more difficult the user feels to manipulate it.

In order to ensure the movable element to be assuredly moved between the enabled and protected positions even though the safety lug is minute, the Japanese Laid-open Patent Publication No. 10-338286, for example, discloses a cartridge storage casing for accommodating a rewritable optical disc cartridge when the latter is not in use, which storage casing is provided with an operating pawl that triggers the slide piece externally through the safety lug while the optical disc cartridge is within the cartridge storage casing. Although the safety system disclosed in this patent publication appears satisfactory, the external operating piece disclosed in the above mentioned publication would no longer work out if the optical disc cartridge is further reduced in size, accompanied by corresponding reduction in size of the movable element inside the. optical disc cartridge. More specifically, if the external operating piece is reduced in size in correspondence with reduction in size of the movable element, difficulty would be encountered in securing a sufficient physical strength in the external operating piece, or the external operating piece would become susceptible to damage when the optical disc cartridge is inadvertently subjected to impacts.

The possibility of the external operating piece being excessively reduced in size may be eliminated if the cartridge storage casing is assembled to a size slightly larger than the optical disc cartridge. However, since demands have arisen for the optical disc cartridge to be manufactured in, a further reduced size while efforts have been made along with it to increase the information recording density of an optical disc, increase in size of the cartridge storage casing is limited.

DISCLOSURE OF INVENTION

Accordingly, the present invention has for its primary object to provide an improved optical disc cartridge wherein the safety device makes use of a switching element, in place of the slidable element such as employed in the prior art optical disc cartridges, to thereby reduce the space occupied inside the optical disc cartridge by the safety device, so that the optical disc cartridge as a whole can be manufactured in a further compact size.

Another object of the present invention is to provide an improved optical disc cartridge of the type referred to above, wherein maximized utilization is made of at least one of the limited corner spaces available in the optical disc cartridge to enable the safety device to be accommodated therein snugly.

A further object of the present invention is to provide an improved optical disc cartridge of the type referred to above, wherein a tubular boss positioned inside the optical disc cartridge so as to surround one of the positioning holes for reinforcing a peripheral lip region around the positioning hole is advantageously utilized for the support of the switching element for movement between the enabled and protected positions.

A still further object of the present invention is to provide an improved optical disc cartridge of the type referred to above, wherein means is provided for-enabling the user to ascertain the position of the switching element from outside of the optical disc cartridge.

A still further object of the present invention is to provide an improved optical disc cartridge of the type referred to above, wherein means is provided to lock the switching element at any one of the enabled and protected positions.

In order to accomplish these and other objects of the present invention, there is provided a disc cartridge accommodating therein an erasable disc-shaped recording medium which includes a disc casing having a disc chamber defined therein for rotatably accommodating the recording medium. The disc casing has a sensor hole and a slot defined in first and second wall portions of the casing that are opposed to each other, so as to extend completely across a thickness of the corresponding wall portion. The disc cartridge also includes a safety device disposed within the disc casing for preventing information recorded on the erasable recording medium from being erased inadvertently.

The safety device includes a bearing bushing positioned at a location spaced from the sensor hole and formed within the disc casing so as to protrude from the first wall portion towards the second wall portion, and a switching element movably accommodated within the disc casing and having first and second ends opposite to each other. The first end of the switching element is rotatably connected with the bearing bushing for angular movement between first and second operative positions. The sensor hole is adapted to be closed by the second end of the switching element when the latter is angularly moved to the first operative position. An operating piece is provided on the switching element so as to extend therefrom and terminate in the slot in the second wall portion. This operating piece is movable within the slot in correspondence with the angular movement of the switching element between the first and second operative positions.

The first and second operative positions of the switching element may be protected and enabled positions, respectively. Accordingly, with the switching element held at the protected position, the recording medium within the casing is advantageously protected from being inadvertently erased.

According to the present invention, the safety device requires a relatively small space for installation thereof within the disc casing and, yet, the switching element forming a part of the safety device can have an increased size, as compared with the prior art safety device utilizing the slide element. The switching element having the increased size is robust enough to ensure the reliability of the safety device.

The first wall portion of the disc casing may have at least one positioning hole defined therein, in which case the bearing bushing is preferably formed on the first wall portion in coaxial relation with the positioning hole.

The switching element employed in the safety device of the present invention is preferably of a structure including a bearing ring rotatably mounted on the bearing bushing, a trunk connected with the bearing ring so as to extend radially outwardly therefrom, and an arm connected with the trunk so as to extend angularly therefrom and adapted to selectively open and close the sensor hole. The operating piece is fixedly mounted on this arm.

The bearing bushing may have a cutout formed therein so as to render the bearing bushing to represent a generally C-shaped configuration, Where the bearing bushing is of the generally C-shaped configuration, the switching element may include a bearing ring rotatably received within the bearing bushing, a. trunk connected with the bearing ring so as to extend radially outwardly therefrom through the cutout, and an arm connected with the trunk so as to extend angularly therefrom and adapted to selectively open and close the sensor hole.

Preferably, the operating piece has a free end face situated within the slot and has an operating recess defined in the free end face for receiving a tip of an instrument when the switching element is to be moved between the first and second operative positions, so that the user can easily manipulate the switching element through the operating piece with the aid of the instrument such as a ball-point pen.

Also preferably, edges of respective portions of the second wall portion confronting opposite ends of the slot are chamfered to define a generally rounded depression, the bottom of which is inwardly curved and inclined from an outer surface of the second wall portion towards the slot, to thereby facilitate an easy access to the operating piece when the user desired to move the switching element from the first operative position towards the second operative position, and vice versa.

The disc cartridge embodying the present invention may be additionally provided with a display means for providing a visual indication of a position of the switching element relative to the sensor hole. This display means may be formed on the bearing ring and is capable of assuming one of two distinct states corresponding to the first and second operative positions of the switching element. To enable the position of the display means to be viewed from outside, a third wall portion of the casing lying perpendicular to any one of the first and second wall portions is formed with a viewing window.

The display means may comprise two areas of the bearing ring that correspond respectively to the two different states of the display means, said two areas being of a different color. Alternatively, the display means may comprise a display cutout formed in a portion of the bearing ring and an outer surface area of the bearing ring neighboring the display cutout. In this alternative embodiment, the display cutout permits a portion of the bearing bushing to be exposed to outside of the disc casing through the viewing window when the switching element is moved to the first operative position, but the outer surface area of the bearing ring is aligned with the viewing window when the switching element is moved to the second operative position.

Preferably, an outer edge of a peripheral lip region of the third wall portion that surrounds the viewing window is chamfered so as to flare outwardly to thereby enhance viewability from outside of the disc casing.

The disc cartridge embodying the present invention may be additionally provided with detent means intervening between the switching element and the first wall portion for clicking the switching element to any one of the first and second operative positions. This detent means may include an elastically deformable detent piece integral with the switching element, a detent protuberance integral with the deformable detent piece so as to protrude towards the first wall portion and two spaced apart detent recesses defined in the first wall portion and spaced a distance corresponding to a distance between the first and second operative positions of the switching element.

According to the present invention, the switching element moves angularly in a generally sector-shaped space within the disc casing between the first and second operative positions. As is well recognized by those skilled in the art, the necessity of a generally rectangular space for the slide member used in the prior art safety device to move make it difficult to define in a wall of the disc casing a plurality of identifier holes for transmitting to a disc player information descriptive of the type or specification of the disc cartridge, at respective location clear from the rectangular space. In contrast thereto, the sector-shaped space allows those identifier holes to be relatively easily defined in the wall of the disc casing without being disturbed by the presence of the switching element. Accordingly, for a given space required, utilization of the limited space available within the disc casing can be maximized according to the present invention, allowing the present invention to provide a more compact disc cartridge having the safety device.

BRIEF DESCRIPTION OF DRAWINGS

The present invention will become readily understood from the following description of preferred embodiments thereof made with reference to the accompanying drawings, in which like parts are designated by like reference numeral and in which.

Figure 1:
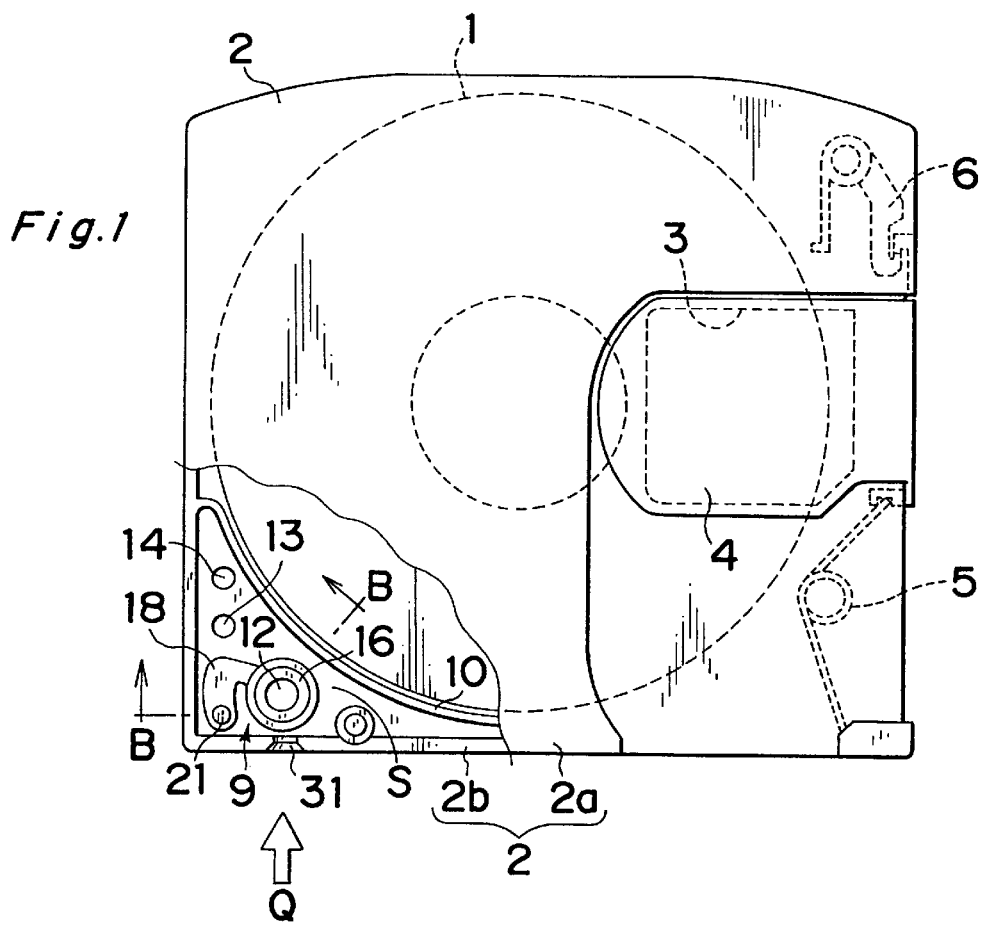
FIG. 1 is a top plan view, with a portion cut away, of a rewritable optical disc cartridge according to a first preferred embodiment of the present invention.

BEST MODE FOR CARRYING OUT THE INVENTION (First Embodiment—FIGS. 1 to 6)

Referring to FIGS. 1 to 6, a rewritable optical disc cartridge is shown, which comprises a generally square flat casing 2 made of plastics and including top and bottom panels 2a and 2b and four side walls, only two of which are shown by 2c and 2d, all assembled together to define a disc chamber therein. An erasable optical disc 1, about 50 mm in outer diameter although not limited thereto, is rotatably housed within the disc chamber. -in practice, however, the casing 2 is made up of casing halves 2a and 2b of a generally identical shape, one having the top panel 23 and the other having the bottom panel 11, which halves are connected together in an non-separable fashion to render the resultant casing to have the top and bottom panels 23 and 11 and the four side walls intervening between the top and bottom panels 23 and 11. Alternatively, the casing 2 may be made up of a generally square lid that defines either the top panel or the bottom panel, and a correspondingly shaped container which when closed by the lid defines a closed disc chamber.

In any event, the casing halves 2a and 2b may be integrated together by means of a plurality of spacer bosses, only one of which is shown by 15, each having one end integral with, for example, the bottom panel 11 and the other end bonded to the top panel 23 by the use of, for example, any known ultrasonic fusion-bonding technique or a suitable bonding agent.

The casing 2 has at least one head access window 3 of a generally rectangular shape defined in, for example, the top panel 23. This head access window 3 is normally closed by a generally U-sectioned shutter member 4 straddling the thickness of the optical disc cartridge. The shutter member 4 is movable between an open position, in which the access window 3 is opened to allow an optical read/write head in any known optical disc player to establish an interactive relation with the optical disc 1 once the optical disc cartridge is loaded in the optical disc player, and a closed positions in which the access window 3 is closed. With the shutter member 4 moved to the closed position, the shutter member 4 is retained in the closed position by a catch 6 as is well known to those skilled in the art.

It is to be noted that depending on the design of the optical disc player with which the optical disc cartridge embodying the present invention works, the head access window 3 may be defined in each of the top and bottom panels 23 and 11 so that the head access windows in those panels 23 and 11 can align with each other and be simultaneously opened or closed by the common shutter member 4.

In the illustrated embodiment, the shutter member 4 is normally biased by a torsional spring 5 disposed within the casing 2 and positioned on one side of the access window 3 opposite to the catch 6, although the use of the torsional spring 5 or any other biasing element is not always essential where the optical disc player is equipped with a dual shutter drive mechanism operable not only to move the shutter member 4 from the closed position towards the open position in response to insertion of the optical disc cartridge into the player, but also to move the shutter member from the opened position towards the closed position, until the catch 6 holds the shutter member 4 immovably in the closed position, in response to withdrawal of the optical disc cartridge from the player.

The optical disc. cartridge of the structure so far described above is well known to those skilled in the art. As a matter of course, the optical disc cartridge has a "leading extremity" that is utilized when the optical disc cartridge is to be loaded into the player (not shown). Specifically, the user has to load the optical disc cartridge into the player with the leading extremity thereof oriented towards the player. Where the optical disc cartridge is of a generally square configuration such as shown, this leading extremity may be identified by a printed or labeled symbol, with or without a legend, descriptive of the direction of insertion. In a preferred embodiment such as shown, however, the leading extremity is visually represented by differentiating one of the four sides of the optical disc cartridge from the remaining sides thereof. More specifically, as best shown in FIG. 1, one of the four side walls of the casing 2 that is shown in top of the sheet of FIG. 1, for example, the side wall opposite to the side wall 2c has its opposite end portions so curved and so shaped to render that side wall to represent a generally arched configuration in contrast to the remaining straight side walls. Henceforth in this specification, the side wall 2c opposite to the arched side wall representing the leading extremity will be referred to as -a trailing side wall.

The disc casing 2 has four discrete inner curved walls that are generally identified by 10 and that occupy respective positions of the shape of a circle of a diameter slightly greater than the optical disc 1. These discrete inner curved walls 10 are positioned inside the casing at respective locations adjacent four corners of the disc casing 2 so as to leave a generally triangular corner space in cooperation with the angularly neighboring side walls of the disc casing 2.

Of the four triangular corner spaces in the disc casing 2, the triangular corner space indicated by S and delimited by the inner curved wall 10, the top and bottom panels 23 and 11 and the angularly adjoining side walls 2c and 2d is of particular interest for the purpose of the present invention. This is because in accordance with the present invention a safety device for preventing information recorded or stored on the erasable optical disc 1 from being erased inadvertently is operatively accommodated within such triangular corner space S. In a preferred embodiment, the triangular corner space S of particular interest is located at one of the four corners of the optical disc cartridge that is located at a left-hand portion adjacent the trailing side wall 2c as viewed in a direction conforming to the direction of insertion of the optical disc cartridge into the disc player.

Figure 3:
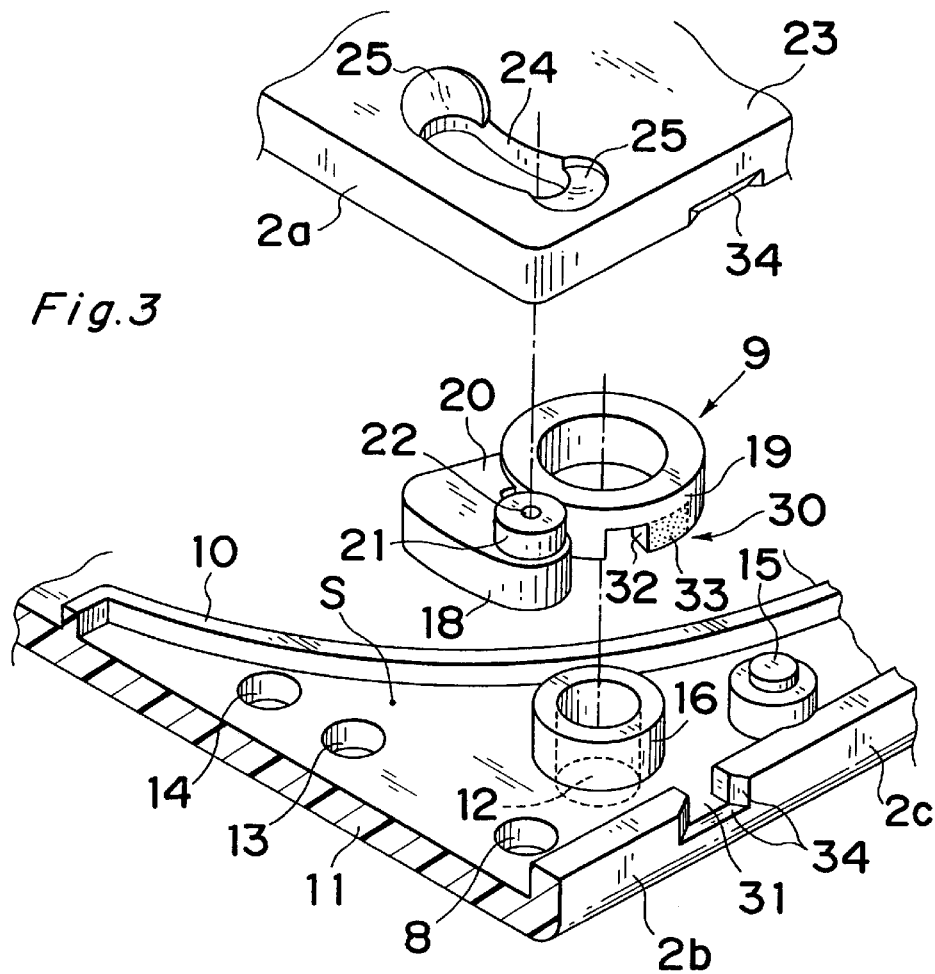
FIG. 3 is an exploded view showing the corner region of the optical disc cartridge shown in FIG. 2.

Referring particularly to FIG. 3, the bottom panel 11 of the disc casing 2 is formed with a plurality of positioning holes that are cooperable with corresponding positioning pins installed in the disc player (not shown). Specifically, when the optical disc cartridge is loaded into the disc player, the positioning pins are engaged in the respective positioning holes so that the loaded optical disc cartridge can be retained at an exact location sufficient to allow the optical disc 1 to be held in an interactive relation with the optical read/write head in the disc player. One of those positioning holes is identified by 12 and is defined in a portion of the bottom panel 11 aligned with the triangular corner space S. The other positioning holes may be defined in the bottom wall 11 at respective left-hand and right hand locations adjacent the leading side wall.

That portion of the bottom panel 11 aligned with the triangular corner space S is additionally formed with a plurality of, for example, two, identifier holes 13 and 14 and a sensor hole 8, all extending across the thickness of the bottom wall 11 and lined up inwardly adjacent and along the side wall 2d. The identifier holes 13 and 14 are utilized to acknowledge the disc player of the type or specification of an optical disc cartridge loaded in the disc player and may be cooperable with mechanical or electric probes installed in the disc player. On the other hand, the sensor hole 8 forms a part of the safety device and is cooperable with a sensor pin (not shown) installed in the disc player for detecting whether the optical disc cartridge loaded into the disc player is write-enabled or write-protected in a manner as will be described in detail subsequently.

Figure 2:
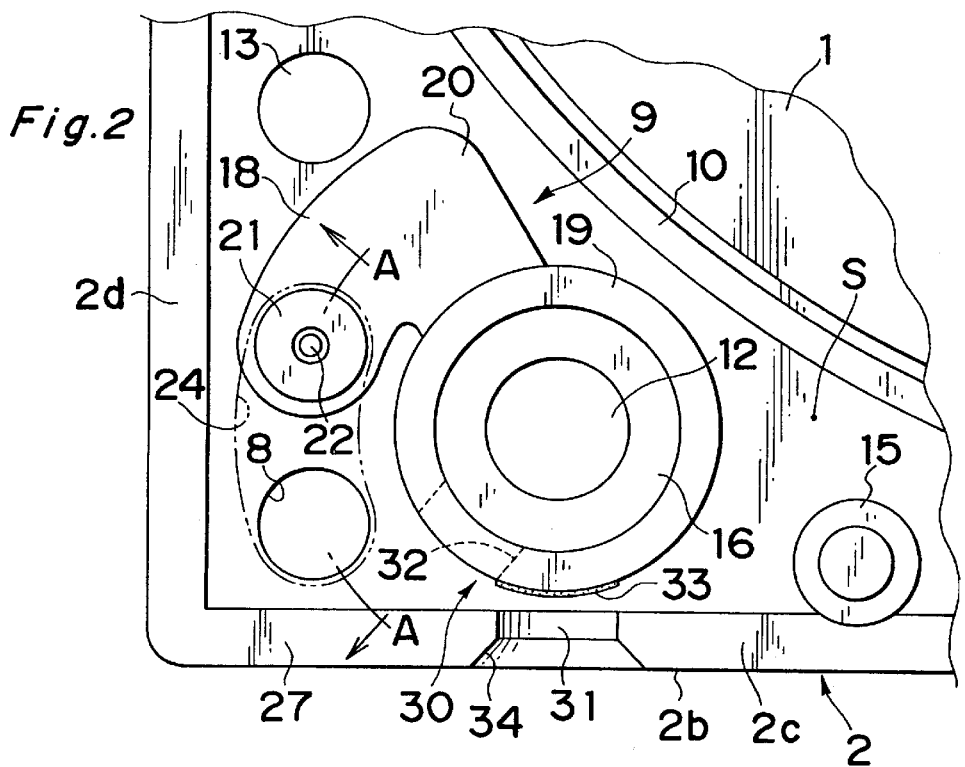
FIG. 2 is a fragmentary top plan view, on an enlarged scale and with a top panel removed, showing one of four corner regions of the optical disc cartridge of FIG. 1 where a safety device is accommodated.

The safety device referred to above comprises a generally L-shaped switching member 9 made of any suitable hard synthetic resin and housed within the triangular corner space S for angular movement between enabled and protected positions. This switching piece 9 is of one-piece molded structure including a bearing ring 19 of an inner diameter equal to or substantially equal to the diameter of the sensor hole 8, a trunk 20 and an arm 18 connected to the bearing ring 19 through the trunk 20. Specifically, the trunk 20 has one end connected with the bearing ring 19 so as to extend radially outwardly therefrom. The arm 18 is acutely angled relative to the trunk 20 and extends from an end of the trunk 20 opposite to the bearing ring 19 in a direction generally conforming to the curvature of the bearing ring 19. The arm 18 is utilized to open or close the sensor hole 8 depending on the position of the switching member 9. In the illustrated embodiment, the sensor hole 8 is closed by the arm 18 when the switching member 9 is moved to the protected position as shown in FIG. 1, but is left open when the switching member 9 is moved to the enabled position as shown in FIG. 2. It is, however, to be noted that depending on the type or specification of the optical disc player, the enabled and protected positions of the switching member 9 may correspond respectively to closure and opening of the sensor hole 8.

A bearing bushing 16 is formed integrally with the bottom panel 11 in coaxial relation with the positioning hole 12 and has an outer diameter substantially equal to the inner diameter of the bearing ring 19. The switching member 9 of the structure described above is supported for angular movement between the enabled and protected positions with the bearing ring 19 mounted on the bearing bushing 16.

Figure 4:
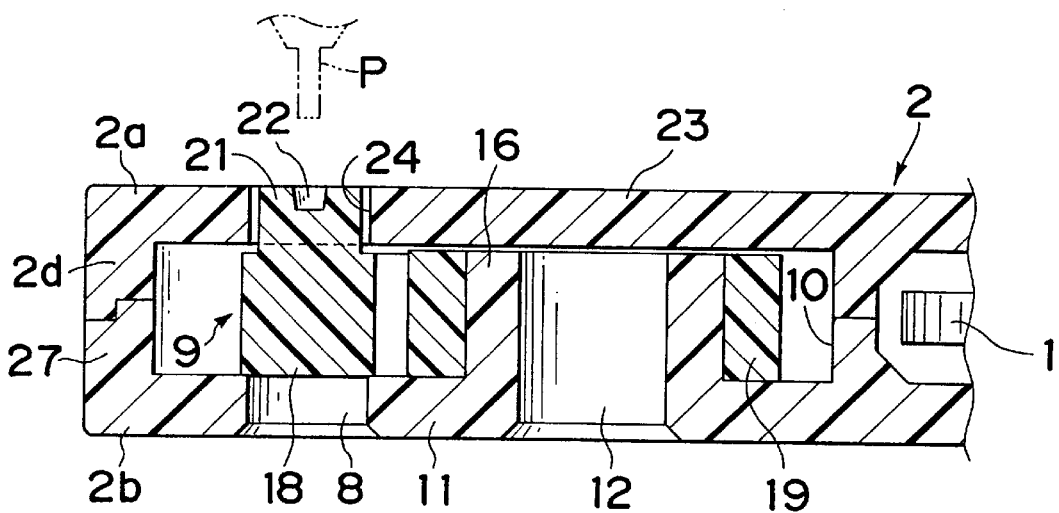
FIG. 4 is a fragmentary cross-sectional view taken along the line B—B in FIG. 2.
Figure 5:
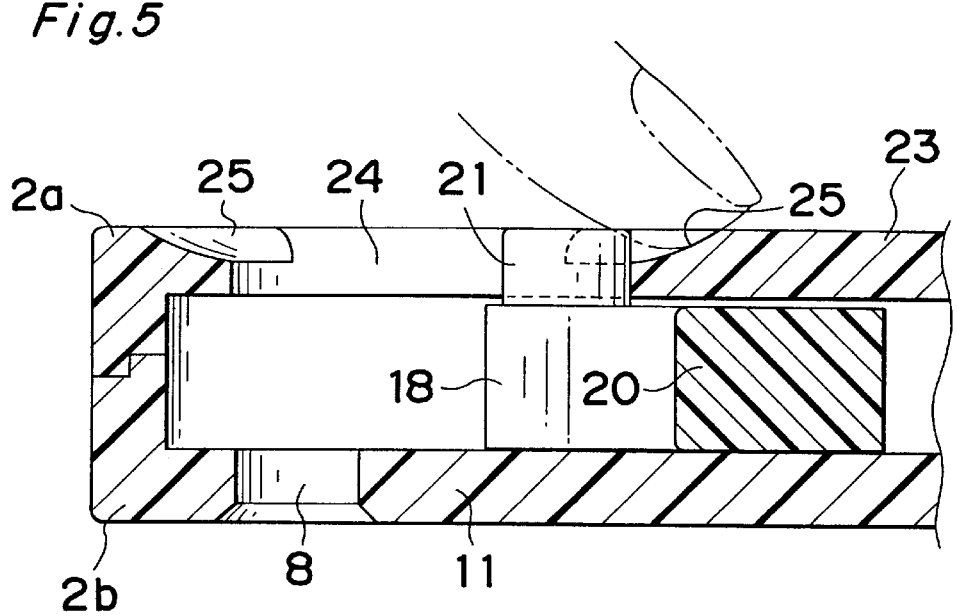
FIG. 5 is a fragmentary cross-sectional view taken along the line A—A in FIG. 2.

As clearly shown in FIGS. 3 to 5, an operating piece 21 is formed integrally with a free end portion of the arm 18 so as to protrude upwardly therefrom, loosely terminating within a slot 24 defined in a portion of the top panel 23 aligned with the triangular corner space S. Preferably, the distance over which the operating piece 21 protrudes upwardly from the arm 18 is so chosen that a free end face of the operating piece 21 remote from the arm 18 can be held in flush with or slightly set back from an outer surface of the top panel 23. The slot 24 may be so curved as to follow the path along which the operating piece 21 is angularly moved during the angular movement of the switching member 9 between the enabled and protected positions about an axis common to the bearing bushing 16 and the bearing ring 19. However, since the path of angular movement of the operating piece 21 represents a curvature of a relatively large radius and is relatively so short as to correspond to the diameter of the sensor hole 8, the slot 24 may extend straight, representing a generally rectangular shape.

With the operating piece 21 formed on the switching member 9, the enabled and protected positions of the switching member 9 are defined by respective opposite ends of the slot 24. In other words, the slot 24 is so shaped as to extend an angular distance corresponding to the distance between a closed position, at which the sensor hole 8 is closed by the arm 18, and an open position at which the arm 18 is clear from the sensor hole 8, leaving the sensor hole 8 open.

The operating piece 21 is accessible to a finger of the user of the optical disc cartridge through the slot 24 in the top panel 23 of the disc casing 2 such that the user can manually move the switching member 9 between the enabled and protected positions. Considering that the operating piece 21 is of a considerably small size, the free end face of the operating piece 21 is formed at its center with an operating recess 22 for receiving a tip of an instrument P such as, for example, a ball-point pen or a pencil as shown by the phantom line in FIG. 4. Thus, it will readily be seen that by inserting the tip of, for example, the ball-point pen P in the recess 22 and then moving the ball-point pen, the switching member 9 can be angularly moved.

To make the tip or nail of the users finger accessible to the operating piece 21, as best shown in FIGS. 3 and 4, upper edges of respective portions of the top panel 23 confronting the opposite ends of the slot 24 are chamfered, or otherwise depleted to define a generally rounded depression 25, the bottom of which is inwardly curved and inclined from the outer surface of the top panel 23 towards the slot 24. Accordingly, when the operating piece 21 is positioned adjacent any one of the opposite ends of the slot 24, an peripheral surface of the operating piece 21 is partially exposed to the outside through the corresponding depression 25 and, therefore, the user can have his finger tip access to the operating piece 21 as shown by the phantom line in FIG. 5.

From the foregoing description, it is clear that by manipulating the operating piece 21 from outside of the optical disc cartridge, the switching member 9 can be angularly moved between the enabled and protected positions. During the angular movement of the switching member 9, the bearing ring 19 rotates around the bearing bushing 16. Depending on which one of the opposite ends of the slot 24 the operating piece is positioned to, the user can ascertain whether the optical disc cartridge is write-enabled or write-protected.

However, considering that the angular distance through which the switching member 9 moves is very small, the optical disc cartridge may not be quickly ascertained as write-enabled or write-protected. To eliminate this inconvenience, the optical disc cartridge embodying the present invention is provided with a display means capable of assuming one of two, visually distinct states corresponding to the enabled and protected positions of the switching member 9 for presenting a visual indication of the position of the switching member and, hence, the safety device.

The display means may take any suitable form. For example, an attractive color, for example, red or yellow, different from that of the operating piece 21 and also from that of at least the top panel 23 may be applied to a surface of the arm 18 adjacent the operating piece 21 so that when the operating piece 21 is located at a position with the arm 18 closing the sensor hole 8 the color on the arm 18 can be exposed to the outside through the slot 24. However, in the illustrated embodiment, the display means comprises a display element 30 formed on an outer peripheral surface of the bearing ring 19 so that the presence or absence of the display element 30 can be viewable from outside of the optical disc cartridge through a viewing window 31 defined in the trailing side wall 2c, particularly, a rear upright wall segment 27 of the lower casing half 2b.

In the embodiment shown, the display element 30 comprises a display cutout 32 formed in the wall of the bearing ring 19 and an area 33 (shown by a hatched area) of the outer peripheral surface of the bearing ring 19 neighboring the display cutout 32. Thus, depending on whether the display cutout 32 is in register with the viewing window 31 or whether the area 33 is in register with the viewing window 31, the user can ascertain the optical disc cartridge having been write-enabled or write-protected. In the illustrated embodiment, when the switching element 9 is in the protected position, the display cutout 32 is in register with the viewing window 31. The area 33 may be colored in a color different from that of the remaining portion of the bearing ring 19 or a colored label may be affixed thereto. Where the bearing ring 19 and the bearing bushing 16 are of distinctive colors, the area 33 may not be colored.

Alternatively, in place of the display cutout 32, the remaining outer peripheral surface of the bearing ring 19 other than the area 33 may have a color distinct from that of the area 33, or only the area 33 may have a color distinct from that of the bearing ring 19.

In any event, the cutout 32 can be formed by depleting a portion of the wall of the bearing ring 19 inwardly from a lower end thereof adjacent the bottom panel 11. Similarly, the viewing window 31 can be formed by depleting a portion of the wall of the upright wall segment 27 inwardly thereof from a free edge thereof remote from the bottom panel 11.

Figure 6:
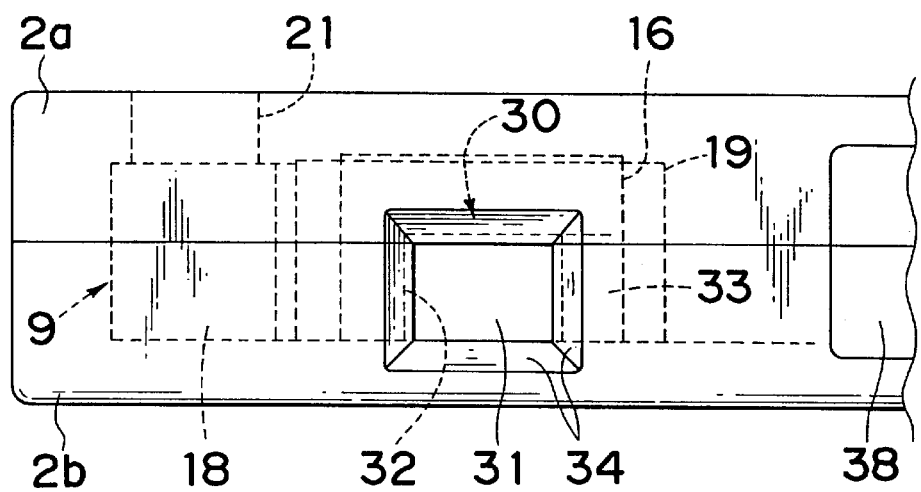
FIG. 6 is a fragmentary front elevational view of the corner region of the optical disc cartridge as viewed along the arrow shown by Q in FIG. 1.

Preferably, to enable the user to view the display element 30 from an slant direction, an outer peripheral edge portion 34 of the trailing side wall 2c around the viewing window 31 is chamfered to flare outwardly so that the area of surface of the viewing window 31 at an outer surface of the trailing side wall 2c can be larger than that at an inner surface of the trailing side wall 2c. Reference numeral 38 shown in FIG. 6 represents a generally rectangular recess defined in the outer surface of the trailing side wall 2c for accommodating a title label that is bonded thereto.

It has now become clear that the position of the switching member 9 can be visually ascertained from outside of the optical disc cartridge not only through the slot 24 in terms of the position of the operating piece 21 within the slot 24, but also through the viewing window 31 in terms of the position of the area 33 or cutout 32 in the bearing ring 19. Accordingly, the display means available at the trailing side wall 2c is particularly advantageous where the optical disc cartridge is placed, together with other disc cartridges, on a shelf in an upright fashion with the trailing side wall 2c oriented forwards.

In the embodiment shown in FIGS. 1 to 6, the bearing bushing 16 has been described having the inner diameter equal to or substantially equal to the diameter of the positioning hole 8. This is particularly advantageous in that the optical disc cartridge loaded into the optical disc player can be accurately positioned in cooperation with the corresponding positioning pin (not shown) relative to the optical read/write head, even though a peripheral lip region of the positioning pin 8 may wear out in repeated contact with the positioning pin.

Figure 7:
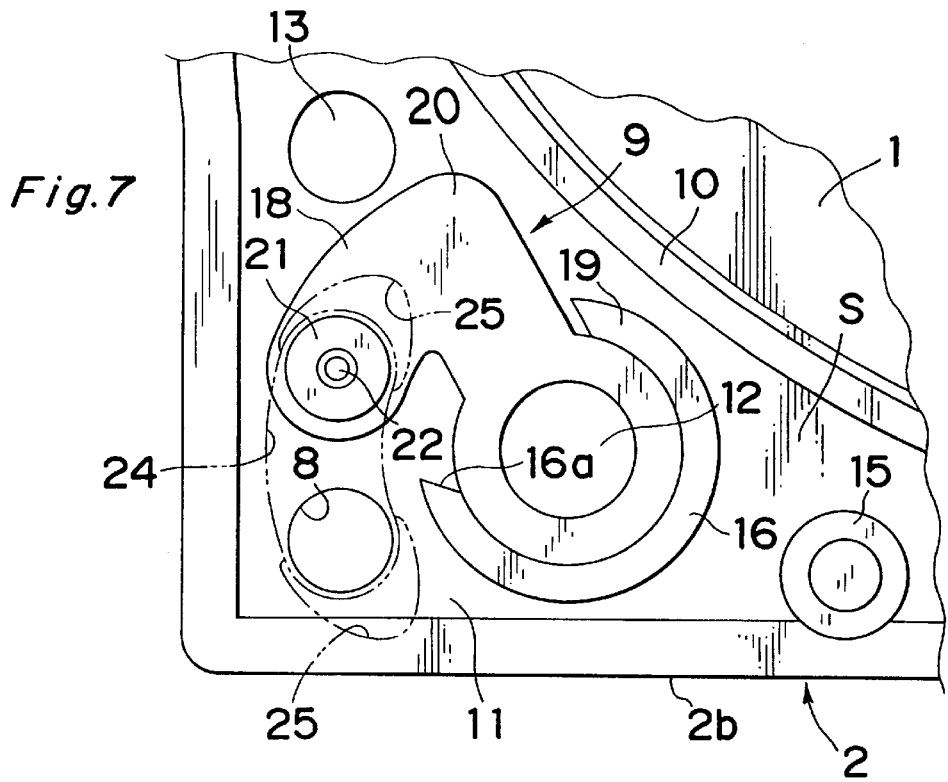
FIG. 7 is a view similar to FIG. 2, showing the optical disc cartridge according to a second preferred embodiment of the present invention.
Figure 8:
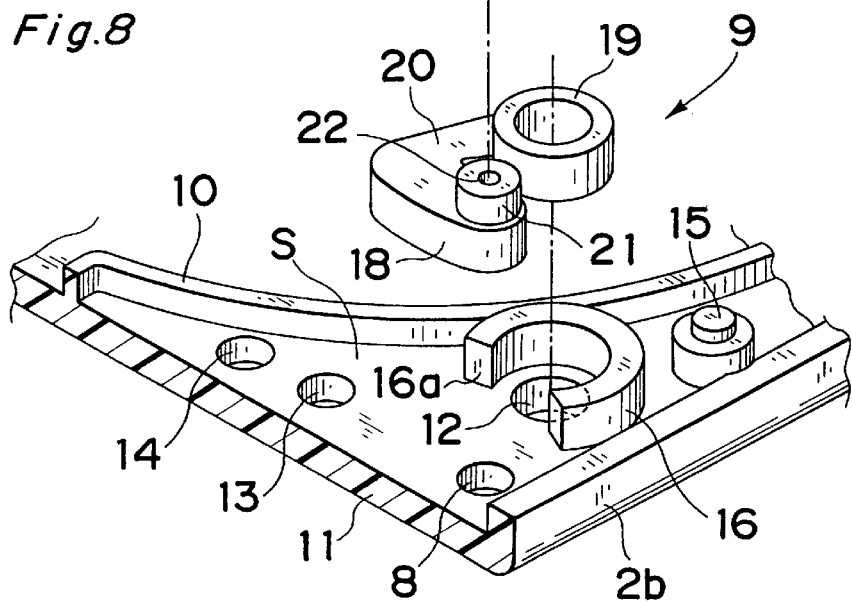
FIG. 8 is an exploded view showing the corner region of the optical disc cartridge shown in FIG. 7.
Figure 9:
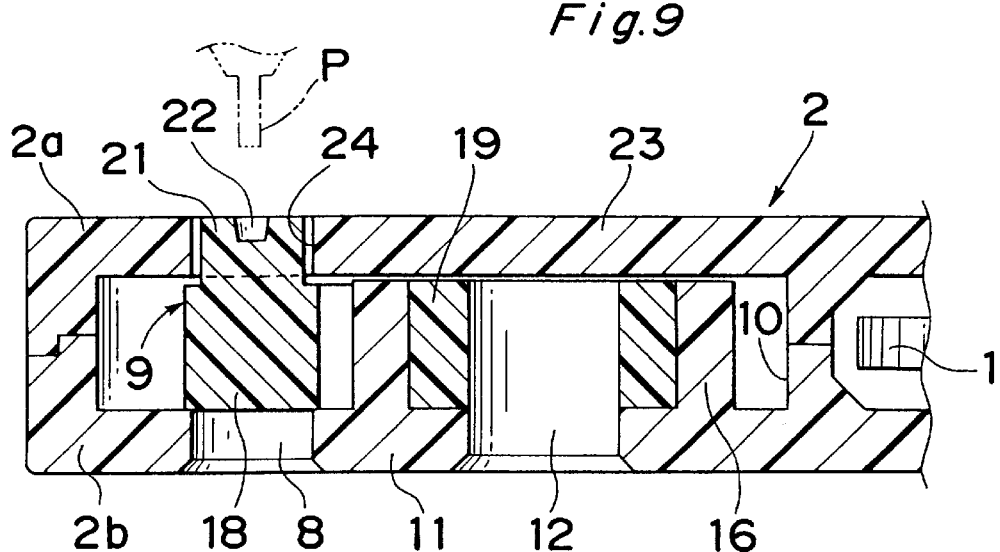
FIG. 9 is a view similar to FIG. 4, showing the safety device employed in the optical disc cartridge shown in FIG. 7.

(Second Embodiment—FIGS. 7 to 9)

In the foregoing embodiment shown in FIGS. 1 to 6, the bearing ring 19 has been shown and described as mounted externally on the bearing bushing 16. However, in the embodiment shown in FIGS. 7 to 9, the bearing ring 19 is positioned inside the bearing bushing 16. For this purpose, the bearing bushing 16 shown in FIGS. 7 to 9 has an inner diameter larger than the diameter of the positioning hole 8 and substantially equal to the outer diameter of the bearing ring 19 while the bearing ring 19 shown in FIGS. 7 to 9 may have an inner diameter substantially equal to or slightly larger than the diameter of the positioning hole 8. The bearing bushing 16 has a wall portion depleted at 16a to render the bearing bushing 16 to represent a generally C-shaped configuration. Accordingly, the trunk 20 of the switching member 9 can move within the depleted area 16a of the bearing bushing 16 during the angular movement of the switching member 9 between the enabled and protected positions.

According to the second embodiment of the present invention, the bearing ring 19 is supported on an annular portion of the inner surface of the bottom panel 11 delimited between the wall of the bearing bushing 16 and the positioning hole 8 in coaxial relation with the positioning hole 8. Accordingly, when the optical disc cartridge according to the second embodiment is loaded into the optical disc player, the corresponding positioning pin (not shown) will protrude into the inner hole of the bearing ring 19 through the positioning hole 8.

Figure 11:
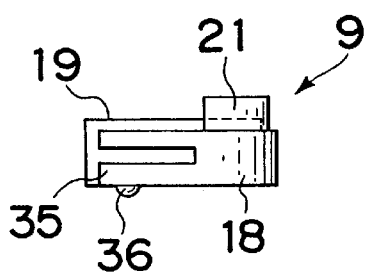
FIG. 11 is a front elevational view of a switching element of the safety device employed in the optical disc cartridge shown in FIG. 10.
Figure 10:
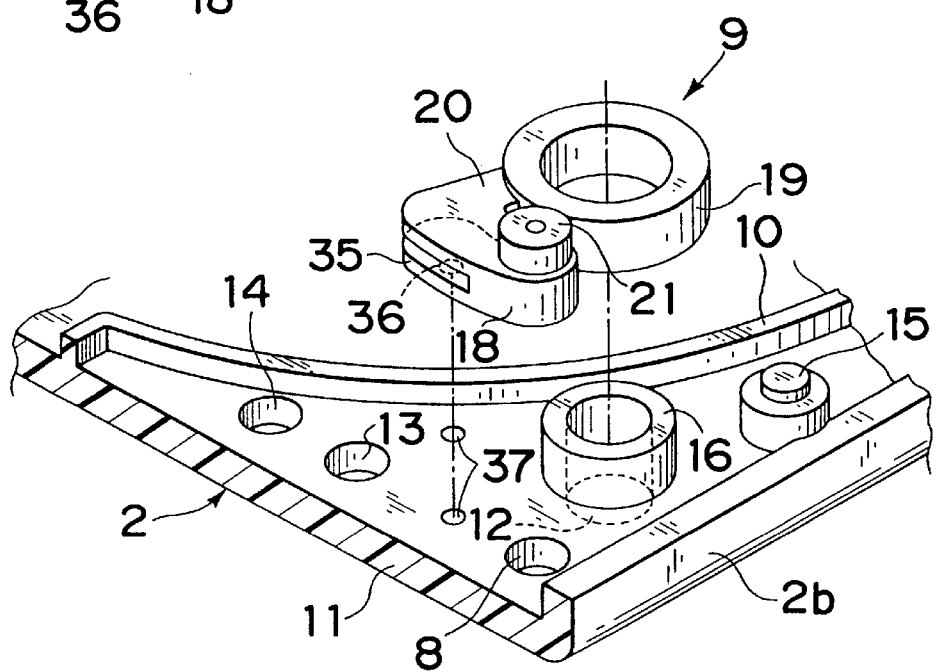
FIG. 10 is a view similar to FIG. 3, showing the optical disc cartridge according to a third preferred embodiment of the present invention.

(Third Embodiment—FIGS. 10 and 11)

According to a third preferred embodiment of the present invention, a detent means is employed for clicking the switching member 9 to any one of the enabled and protected positions. With this detent means, the switching member 9 being moved towards either the enabled position or the protected position can be clicked onto and be therefore retained at the position to which it is angularly moved. The detent means comprises spaced apart detent recesses 37 defined in the inner surface of the bottom panel 11 at respective locations corresponding to the enabled and protected positions of the switching member 9, and a detent protuberance 36 engageable selectively into the detent recesses 37 one at a time and formed on an undersurface of an angled area of the switching member 9 between the trunk 20 and the arm 18 so as to protrude outwardly therefrom.

While the detent means of the structure so far described above works satisfactorily, that angled area of the switching member 9 between the trunk 20 and the arm 18 is preferably slotted inwardly to define an elastically deformable detent piece 35 on one side of the slot adjacent the bottom panel 11. Accordingly, each time the detent protuberance 36 disengages out of any one of the detent recesses 37 incident to the angular movement of the switching member 9, that elastically deformable detent piece 35 of the arm 18 can be deformed against its own resiliency wherefore the switching member 9 itself need not be substantially fluctuated. The use of the detent means is effective to avoid any possible accidental departure of the switching member 9 from the enabled or protected position.

It is to be noted that the detent recesses 37 and the detent protuberances, which have been described as formed in the bottom panel 11 and the arm 18, respectively, may be reversed in position relative to each other. In addition, the detent means may be so positioned as to intervene between the free end portion of the arm 18 and the bottom panel 11 or between the bearing ring 19 and the bearing bushing 16 or between the bottom panel 11 and an adjacent annular end face of the bearing ring 19.

The idea envisioned by the third embodiment of the present invention is equally applicable to any one of the first and second embodiments of the present invention.

Although the present invention has been described in connection with the preferred embodiments thereof with reference to the accompanying drawings, it is to be noted that various changes and modifications are apparent to those skilled in the art. By way of example, the operating piece 21 which has been shown and described as formed on the arm 18 may be formed on the bearing ring 19.

Also, in any of the foregoing embodiments of the present invention, the safety device has been described as accommodated within the triangular corner space S that is located at the left-hand portion adjacent the trailing side wall 2c. However, the safety device may be accommodated within any other triangular corner space, for example, that located at the right-hand portion adjacent the trailing side wall 2c if no biasing spring 5 is employed or that located at the left-hand portion adjacent the leading side wall.

Furthermore, although reference has been made to the optical disc, the disc accommodated within the cartridge designed in accordance with the present invention may not be always limited to the optical disc, but may be a magnetic recording and/or reproducing disc.

Accordingly, such changes and modifications are to be understood as included within the scope of the present invention as defined by the appended claims, unless they depart therefrom.

INDUSTRIAL APPLICABILITY

The present invention having thus described is effective to maximize the limited space available in the optical disc cartridge for accommodating the safety device for preventing information, recorded or otherwise stored on the rewritable disc, from being erased inadvertently, without unduly increasing the size of the cartridge. The present invention is believed to be promising where the optical disc cartridge is manufactured in a compact size and, yet, require the provision of the safety device of the kind discussed hereinabove.

What is claimed is:

1. A disc cartridge accommodating therein an erasable disc-shaped recording medium, said disc cartridge comprising:

a disc casing having a disc chamber defined therein, said erasable recording medium being rotatably accommodated within said disc chamber, said disc casing also having a sensor hole and a positioning hole both defined in a first wall portion of the disc casing and a slot defined in a second wall portion of the disc casing opposed to the first wall portion, each of said sensor hole, positioning hole and slot extending completely across a thickness of the corresponding wall portion, said positioning hole being adapted to be cooperable with a corresponding positioning pin installed in a disc player; and a safety device disposed within the disc casing for preventing information recorded on the erasable recording medium from being erased inadvertently, said safety device comprising:

a bearing bushing formed on the first wall portion within the disc casing in coaxial relation with the positioning hole so as to protrude from the first wall portion towards the second wall portion, said bearing bushing being positioned at a location spaced from the sensor hole;

a switching element movably accommodated within the disc casing and having first and second ends opposite to each other, said first end of the switching element being rotatably connected with the bearing bushing for angular movement between first and second operative positions, said sensor hole being closed by the second end of the switching element when the latter is angularly moved to the first operative position; and an operating piece provided on the switching element so as to extend therefrom and terminate in the slot in the second wall portion, said operating piece being movable within the slot in correspondence with the angular movement of the switching element between the first and second operative positions.

2. The disc cartridge as claimed in claim 1, wherein the first wall portion has at least one positioning hole defined therein and wherein the bearing bushing is formed on the first wall portion in coaxial relation with the positioning hole.

3. The disc cartridge as claimed in claim 1, wherein the operating piece has a free end face situated within the slot and has an operating recess defined in the free end face for receiving a tip of an instrument when the switching element is to be moved between the first and second operative positions.

4. The disc cartridge as claimed in claim 1, wherein edges of respective portions of the second wall portion confronting opposite ends of the slot are chamfered to define a generally rounded depression, the bottom of which is inwardly curved and inclined from an outer surface of the second wall portion towards the slot.

5. The disc cartridge as claimed in claim 1, further comprising detent means intervening between the switching element and the first wall portion for clicking the switching element to any one of the first and second operative positions.

6. A disc cartridge accommodating therein an erasable disc-shaped recording medium, said disc cartridge comprising:

a disc casing having a disc chamber defined therein, said erasable recording medium being rotatably accommodated within said disc chamber, said disc casing also having a sensor hole and a positioning hole both defined in a first wall portion of the disc casing and a slot defined in a second wall portion of the disc casing opposed to the first wall portion, each of said sensor hole, positioning hole and slot extending completely across a thickness of the corresponding wall portion, said positioning hole being adapted to be cooperable with a corresponding positioning pin installed in a disc player; and a safety device disposed within the disc casing for preventing information recorded on the erasable recording medium from being erased inadvertently, said safety device comprising:

a bearing bushing formed on the first wall portion within the disc casing in coaxial relation with the positioning hole so as to protrude from the first wall portion towards the second wall portion, said bearing bushing being positioned at a location spaced from the sensor hole;

a switching element movably accommodated within the disc casing and having first and second ends opposite to each other, said first end of the switching element being rotatably connected with the bearing bushing for angular movement between first and second operative positions, said sensor hole being closed by the second end of the switching element when the latter is angularly moved to the first operative position; and an operating piece provided on the switching element so as to extend therefrom and terminate in the slot in the second wall portion, said operating piece being movable within the slot in correspondence with the angular movement of the switching element between the first and second operative positions, wherein the switching element includes a bearing ring rotatably mounted on the bearing bushing, a trunk connected with the bearing ring so as to extend radially outwardly therefrom, and an arm connected with the trunk so as to extend angularly therefrom and adapted to selectively open and close the sensor hole, and wherein said operating piece is fixedly mounted on the arm.

7. The disc cartridge as claimed in claim 6, wherein the bearing bushing has a cutout formed therein so as to render the bearing bushing to represent a generally C-shaped configuration, wherein the switching element includes a bearing ring rotatably received within the bearing bushing, a trunk connected with the bearing ring so as to extend radially outwardly therefrom through the cutout, and an arm connected with the trunk so as to extend angularly therefrom and adapted to selectively open and close the sensor hole, and wherein said operating piece is fixedly mounted on the arm.

8. The disc cartridge as claimed in claim 6, further comprising a display means for providing a visual indication of a position of the switching element relative to the sensor hole, said display means being formed on the bearing ring and capable of assuming one of two distinct states corresponding to the first and second operative positions of the switching element and wherein a third wall portion of the casing lying perpendicular to any one of the first and second wall portions is formed with a viewing window through which the display means is viewable from outside of the disc casing.

9. The disc cartridge as claimed in claim 8, wherein the display means comprises two areas of the bearing ring that correspond respectively to the two different states of the display means, said two areas being of a different color.

10. The disc cartridge as claimed in claim 8, wherein the display means comprises a display cutout formed in a portion of the bearing ring and an outer surface area of the bearing ring neighboring the display cutout, said display cutout when the switching element is moved to the first operative position permitting a portion of the bearing bushing to be exposed to outside of the disc casing through the viewing window while said outer surface area of the bearing ring is aligned with the viewing window when the switching element is moved to the second operative position.

11. The disc cartridge as claimed in claim 8, wherein a outer edge of a peripheral lip region of the third wall portion that surrounds the viewing window is chamfered so as to flare outwardly.

12. A disc cartridge accommodating therein an erasable disc-shaped recording medium, said disc cartridge comprising:

a disc casing having a disc chamber defined therein, said erasable recording medium being rotatably accommodated within said disc chamber, said disc casing also having a sensor hole and a positioning hole both defined in a first wall portion of the disc casing and a slot defined in a second wall portion of the disc casing opposed to the first wall portion, each of said sensor hole, positioning hole and slot extending completely across a thickness of the corresponding wall portion, said positioning hole being adapted to be cooperable with a corresponding positioning pin installed in a disc player; and a safety device disposed within the disc casing for preventing information recorded on the erasable recording medium from being erased inadvertently, said safety device comprising:

a bearing bushing formed on the first wall portion within the disc casing in coaxial relation with the positioning hole so as to protrude from the first wall portion towards the second wall portion, said bearing bushing being positioned at a location spaced from the sensor hole;

a switching element movably accommodated within the disc casing and having first and second ends opposite to each other, said first end of the switching element being rotatably connected with the bearing bushing for angular movement between first and second operative positions, said sensor hole being closed by the second end of the switching element when the latter is angularly moved to the first operative position; and an operating piece provided on the switching element so as to extend therefrom and terminate in the slot in the second wall portion, said operating piece being movable within the slot in correspondence with the angular movement of the switching element between the first and second operative positions detent means intervening between the switching element and the first wall portion for clicking the switching element to any one of the first and second operative positions wherein said detent means includes an elastically deformable detent piece integral with the switching element, a detent protuberance integral with the deformable detent piece so as to protrude towards the first wall portion and two spaced apart detent recesses defined in the first wall portion and spaced a distance corresponding to a distance between the first and second operative positions of the switching element.

* * * * *